(12) United States Patent
Liu et al.

(10) Patent No.: US 11,930,428 B2
(45) Date of Patent: Mar. 12, 2024

(54) METHOD AND SYSTEM FOR REALIZING SERVICE-BASED MOBILE ORIGINATED SHORT MESSAGE SERVICE

(71) Applicant: CHINA TELECOM CORPORATION LIMITED, Beijing (CN)

(72) Inventors: Liu Liu, Beijing (CN); Biao Long, Beijing (CN); Yue Sun, Beijing (CN); Jiayifan Liu, Beijing (CN); Zhuoyi Chen, Beijing (CN); Mingxue Li, Beijing (CN); Qingyang Wang, Beijing (CN); Linfeng Zhang, Beijing (CN); Ke Yin, Beijing (CN); Lei Cao, Beijing (CN); Bo Wang, Beijing (CN); Ye Zhao, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/034,276

(22) PCT Filed: Oct. 18, 2021

(86) PCT No.: PCT/CN2021/124399
§ 371 (c)(1),
(2) Date: Apr. 27, 2023

(87) PCT Pub. No.: WO2022/089238
PCT Pub. Date: May 5, 2022

(65) Prior Publication Data
US 2023/0403539 A1   Dec. 14, 2023

(30) Foreign Application Priority Data
Oct. 29, 2020   (CN) .......................... 202011180925.0

(51) Int. Cl.
*H04W 4/14* (2009.01)
*H04W 8/02* (2009.01)
*H04W 92/04* (2009.01)

(52) U.S. Cl.
CPC ............... *H04W 4/14* (2013.01); *H04W 8/02* (2013.01); *H04W 92/04* (2013.01)

(58) Field of Classification Search
CPC ........... H04W 4/14; H04W 8/02; H04W 8/08; H04W 92/04
See application file for complete search history.

(56) References Cited

U.S. PATENT DOCUMENTS 10,805,983 B2 * 10/2020 Talebi Fard .......... H04W 68/02
2005/0003838 A1    1/2005 McCann et al.
(Continued)

FOREIGN PATENT DOCUMENTS

CN    101184258 A    5/2008
CN    101442722 A    5/2009
(Continued)

OTHER PUBLICATIONS

China Telecom et al. "Pseudo-CR on Introduction" 3GPP TSG-CT WG4 Meeting #98e C4-204118, Aug. 11, 2020 (Aug. 11, 2020), entire document.
(Continued)

*Primary Examiner* — Wayne H Cai
(74) *Attorney, Agent, or Firm* — Calderon Safran & Cole P.C.

(57) ABSTRACT

Provided are a method and system for realizing a service-based mobile originated short message service. The method for realizing a service-based mobile originated short message service (MO SMS) includes: after receiving a short message transferred from a user equipment, an SMSF entity querying, from a NRF entity, information of a network
(Continued)

function that can provide a MO SMS forwarding service; when it is determined, according to a query result, that a corresponding SMS-IWMSC can provide the MO SMS forwarding service, the SMSF entity sending the short message to the SMS-IWMSC; and the SMS-IWMSC sending the short message to a SC, so that the SC sends the short message to a corresponding receiver of the short message.

20 Claims, 3 Drawing Sheets

(56) References Cited

U.S. PATENT DOCUMENTS

| | | | |
|---|---|---|---|
| 2009/0221310 | A1 | 9/2009 | Chen |
| 2010/0029311 | A1 | 2/2010 | Macek |
| 2010/0304765 | A1 | 12/2010 | Bhatt et al. |
| 2021/0168571 | A1 | 6/2021 | Tang |
| 2021/0385734 | A1* | 12/2021 | Keller ............... H04L 67/51 |
| 2022/0346052 | A1* | 10/2022 | Foti ............... H04W 60/04 |

FOREIGN PATENT DOCUMENTS

| | | |
|---|---|---|
| CN | 101448217 A | 6/2009 |
| CN | 101622889 A | 1/2010 |
| CN | 102026124 A | 4/2011 |
| CN | 109936827 A | 6/2019 |
| CN | 110392369 A | 10/2019 |

OTHER PUBLICATIONS

3rd Generation Partnership Project; Technical Specification Group Core Network and Terminals. "Service-based support for SMS in 5GC (Release 17)" 3GPP TR 29.829 V0.3.0, Feb. 8, 2021 (Feb. 8, 2021), sections 6.2 and 6.5.
3rd Generation Partnership Project; Technical Specification Group Services and System Aspects. "Procedures for the 5G System (SGS); Stage 2(Release 16)" 3GPP TS 23.502 VI6.6.0, Sep. 24, 2020 (Sep. 24, 2020), section 4.13.3.
Decision to Grant issued in corresponding Chinese Patent Application No. 202011180925.0; 6 pages.
International Search Report and Written Opinion dated Jan. 6, 2022 in corresponding Application No. PCT/CN2021/124399; 7 pages.
Office Action (Notice of Reasons for Refusal) issued in related Japanese Patent Application No. 2023-526420 dated Sep. 26, 2023; 8 pages.
3GPP TSG-CT WG4 Meeting #101e, E-Meeting, Nov. 3-13, 2020; C4-205288; China Telecom; Pseudo-CR on Solution for KI SBI-based SM MO; 4 pages.
3GPP TSG-CT WG4 Meeting #101e, E-Meeting, Nov. 3-13, 2020; C4-205168; http 3xx redirection; Nokia, Nokia Shanghai Bell; 18 pages.
SA WG2 Meeting #116bis Aug. 29-Sep. 2, 2016, Sanya, P.R. China; S2-164577; Nokia, Verizon, USCellular; MO SMS over T4; 5 pages.
3GPP TSG WA WG2 Meeting #86; Jul. 11-15, 2011, Naantali, Finland; TD S2-113770; Vodafone, Huawei; SIMTC—Key Issue: Identifiers; 7 pages.
SA WG2 Meeting #129 Oct. 15-19, 2018, Dongguan, P.R. China; S2-1811186; CATT; Solution for Local LCS architecture; 6 pages.

* cited by examiner

METHOD AND SYSTEM FOR REALIZING SERVICE-BASED MOBILE ORIGINATED SHORT MESSAGE SERVICE

CROSS-REFERENCE TO RELATED APPLICATIONS

The present application is a U.S. National Stage Application under 35 U.S.C. § 371 of International Patent Application No. PCT/CN2021/124399, filed on Oct. 18, 2021, which is based on and claims priority to China Patent Application No. 202011180925.0 filed on Oct. 29, 2020, the disclosures of which are incorporated by reference herein in their entireties.

TECHNICAL FIELD

The present disclosure relates to a method and system for realizing a service-based Mobile Originated Short Message Service.

BACKGROUND

In the fifth-generation mobile communication system (the Fifth Generation, 5G), Mobile Originated Short Message Service (MO SMS) over Network Access Server (NAS) service refers to a NAS short message service initiated by a user equipment (abbreviated as UE) and received by a Service Center (abbreviated as SC) of short message, which contains short message submission (SMS SUBMIT), short message command (SMS COMMAND), Session Initiation Protocol (SIP) message transmission and the like.

SUMMARY

According to a first aspect of the embodiments of the present disclosure, a method for realizing a service-based Mobile Originated Short Message Service is provided. The method comprises: querying, by a Short Message Service Function (SMSF) entity, an information of a network function capable of providing a Mobile Originated Short Message Service (MO SMS) forwarding service from a Network Repository Function (NRF) entity, after receiving a short message transferred from a user equipment; sending, by the SMSF entity, the short message to an Interworking Mobile Switching Center for Short Message Service (SMS-IWMSC), in a case where it is determined that the SMS-IWMSC is capable of providing the MO SMS forwarding service according to a query result; and sending, by the SMS-IWMSC, the short message to a Service Center (SC) of the short message, so that the SC sends the short message to a corresponding receiver of the short message.

In some embodiments, the querying, by the SMSF entity, the information of the network function capable of providing the MO SMS forwarding service from the NRF entity according to at least one of a Subscription Permanent Identifier (SUPI), a Generic Public Subscription Identifier (GPSI), or an address of the SC, wherein the information of the network function capable of providing the MO SMS forwarding service comprises an IP address or a Fully Qualified Domain Name (FQDN) address of the SMS-IWMSC.

In some embodiments, sending, by the SMSF entity, a callback IP address and an information of a timer for waiting to the SMS-IWMSC during a process of sending the short message to the SMS-IWMSC.

In some embodiments, sending, by the SMS-IWMSC, a delivery report, which is sent by the SC, to the SMSF entity according to the callback IP address or a FQDN address of the SMSF entity; and sending, by the SMSF entity, the delivery report to the user equipment.

In some embodiments, the SMSF entity and the SMS-IWMSC interact through a service-based interface.

In some embodiments, registering, by the SMS-IWMSC, a capability of providing the MO SMS forwarding service in the NRF entity during a network function registration procedure.

In some embodiments, sending, by the SMSF entity, the short message to a IP-Short Message-Gateway (IP-SM-GW), in a case where it is determined that the IP-SM-GW and the SMS-IWMSC are capable of providing the MO SMS forwarding service according to the query result; and sending, by the IP-SM-GW, the short message to the SMS-IWMSC.

In some embodiments, sending, by the SMS-IWMSC, a delivery report, which is sent by the SC, to the IP-SM-GW; sending, by the IP-SM-GW, the delivery report to the SMSF entity; and sending, by the SMSF entity, the delivery report to the user equipment.

In some embodiments, the SMSF entity and the IP-SM-GW interact through a service-based interface; and the SMS-IWMSC and the IP-SM-GW interact through a service-based interface.

In some embodiments, registering, by the SMS-IWMSC, a capability of providing the MO SMS forwarding service in the NRF entity during a network function registration procedure; and registering, by the IP-SM-GW, a capability of providing the MO SMS forwarding service in the NRF entity during a network function registration procedure.

According to a second aspect of the embodiments of the present disclosure, a system for realizing a service-based Mobile Originated Short Message Service is provided. The system comprises: a Short Message Service Function (SMSF) entity configured to query an information of a network function capable of providing a Mobile Originated Short Message Service (MO SMS) forwarding service from a Network Repository Function (NRF) entity after receiving a short message transferred from a user equipment, and send the short message to an Interworking Mobile Switching Center for Short Message Service (SMS-IWMSC) in a case where it is determined that the SMS-IWMSC is capable of providing the MO SMS forwarding service according to a query result; the NRF entity configured to provide an information of a network function with a capability of the MO SMS forwarding service; the SMS-IWMSC configured to send the short message to a Service Center (SC) of the short message; and the SC configured to send the short message to a corresponding receiver of the short message.

In some embodiments, the SMSF entity is configured to query the information of the network function capable of providing the MO SMS forwarding service from the NRF entity according to at least one of a Subscription Permanent Identifier (SUPI), a Generic Public Subscription Identifier (GPSI), or an address of the SC, wherein the information of the network function capable of providing the MO SMS forwarding service comprises an IP address or a Fully Qualified Domain Name (FQDN) address of the SMS-IWMSC.

In some embodiments, the SMSF entity is further configured to send a callback IP address and an information of a timer for waiting to the SMS-IWMSC during a process of sending the short message to the SMS-IWMSC.

In some embodiments, the SMS-IWMSC is further configured to send a delivery report, which is sent by the SC, to the SMSF entity according to the callback IP address or a FQDN address of the SMSF entity; and the SMSF entity is further configured to send the delivery report to the user equipment.

In some embodiments, the SMSF entity and the SMS-IWMSC interact through a service-based interface.

In some embodiments, the SMS-IWMSC is configured to register a capability of providing the MO SMS forwarding service in the NRF entity during a network function registration procedure.

In some embodiments, the above-described system further comprises an IP-Short Message-Gateway (IP-SM-GW), wherein: the SMSF entity is further configured to send the short message to the IP-SM-GW in a case where it is determined that the IP-SM-GW and the SMS-IWMSC are capable of providing the MO SMS forwarding service according to the query result; and the IP-SM-GW is configured to send the short message to the SMS-IWMSC.

In some embodiments, the SMS-IWMSC is further configured to send a delivery report, which is sent by the SC, to the IP-SM-GW; the IP-SM-GW is further configured to send the delivery report to the SMSF entity; and the SMSF entity is further configured to send the delivery report to the user equipment.

In some embodiments, the SMSF entity and the IP-SM-GW interact through a service-based interface; and the SMS-IWMSC and the IP-SM-GW interact through a service-based interface.

In some embodiments, the SMS-IWMSC is configured to register a capability of providing the MO SMS forwarding service in the NRF entity during a network function registration procedure; and the IP-SM-GW is configured to register a capability of providing the MO SMS forwarding service in the NRF entity during a network function registration procedure.

Other features and advantages of the present disclosure will become apparent by the following detailed description of exemplary embodiments of the present disclosure with reference to the accompanying drawings.

BRIEF DESCRIPTION OF THE ACCOMPANYING DRAWINGS

In order to more explicitly explain the embodiments of the present disclosure or the technical solutions in the prior art, the accompanying drawings required to be used in the description of the embodiments or the prior art will be briefly introduced below. It is apparent that the accompanying drawings illustrated below are merely some of the embodiments of the present disclosure. For those of ordinary skill in the art, other accompanying drawings may also be obtained according to these accompanying drawings on the premise that no inventive effort is involved.

DETAILED DESCRIPTION

The technical solutions in the embodiments of the present disclosure will be explicitly and completely described below in conjunction with the accompanying drawings in the embodiments of the present disclosure. Apparently, the embodiments described are merely a part of, rather than all of the embodiments of the present disclosure. The following descriptions of at least one exemplary embodiment which are in fact merely illustrative, shall by no means serve as any limitation on the present disclosure as well as its application or use. On the basis of the embodiments in the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these embodiments shall not limit the scope of the present disclosure.

At the same time, it should be understood that for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description in appropriate situations.

Among all the examples shown and discussed here, any specific value shall be construed as being merely exemplary, rather than as being restrictive. Thus, other examples of the exemplary embodiments may have different values.

It should be noted that: similar numerals and letters present similar items in the following accompanying drawings, and therefore, once an item is defined in one accompanying drawing, it is unnecessary to make further discussion on it in a subsequent accompanying drawing.

The inventors have found through studies that, in current SMS over NAS architecture, a Short Message Service Function (SMSF) entity and a Unified Data Management (UDM) entity cannot open a service-based interface to an IP-Short Message-Gateway (IP-SM-GW), a SMS router or an Interworking Mobile Switching Center for Short Message Service (SMS IWMSC), which makes that a MO SMS is required to be sent between these network functions through traditional Mobile Application Part (MAP) protocol or Diameter protocol, and makes that a fully service-based MO SMS cannot be realized within a range of 5GS, thereby reducing the flexibility of network deployment, and at the same time, there may be a security issue related to MAP protocol and Diameter protocol when roaming across Public Land Mobile Network (PLMN).

Accordingly, the present disclosure provides a solution for realizing a service-based Mobile Originated Short Message Service, which can effectively realize a fully service-based MO SMS within the range of 5GS.

Figure 1:
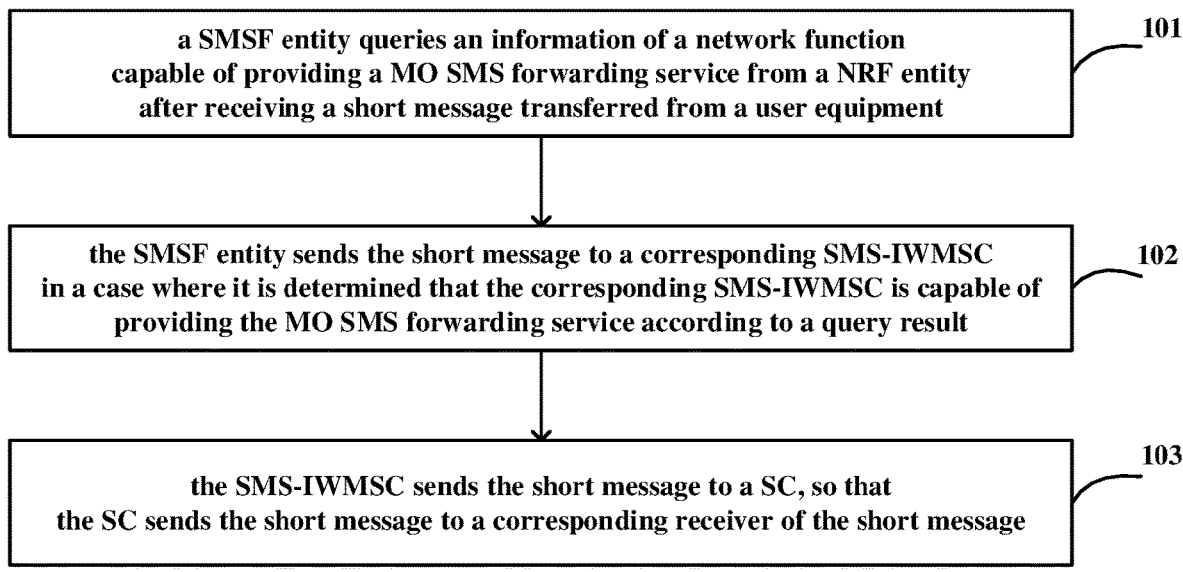
FIG. 1 is a schematic flowchart of a method for realizing a service-based Mobile Originated Short Message Service according to one embodiment of the present disclosure.

FIG. 1 is a schematic flowchart of a method for realizing a service-based Mobile Originated Short Message Service according to one embodiment of the present disclosure.

In step 101, a SMSF entity queries an information of a network function capable of providing a MO SMS forwarding service from a Network Repository Function (NRF) entity after receiving a short message transferred from a user equipment.

In some embodiments, the SMSF entity queries the information of the network function capable of providing the MO SMS forwarding service from the NRF entity according to at least one of a Subscription Permanent Identifier (SUPI), a Generic Public Subscription Identifier (GPSI), or an address of a SC. The information of the network function capable of providing the MO SMS forwarding service comprises an IP address or a Fully Qualified Domain Name (FQDN) address of a corresponding SMS-IWMSC.

In Step 102, the SMSF entity sends the short message to a corresponding SMS-IWMSC in a case where it is determined that the corresponding SMS-IWMSC is capable of providing the MO SMS forwarding service according to a query result. The query result is obtained in step 101.

In some embodiments, the SMSF entity sends a callback IP address and an information of a timer for waiting to the SMS-IWMSC during a process of sending the short message to the SMS-IWMSC.

In some embodiments, the SMS-IWMSC registers a capability of providing the MO SMS forwarding service in the NRF entity during a network function registration procedure.

In some embodiments, the SMSF entity and the SMS-IWMSC interact through a service-based interface.

In Step 103, the SMS-IWMSC sends the short message to a SC, so that the SC sends the short message to a corresponding receiver of the short message.

In some embodiments, the SMS-IWMSC sends a delivery report, which is sent by the SC, to the SMSF entity according to the callback IP address or a FQDN address of the SMSF entity, so that the SMSF entity sends the delivery report to the user equipment.

In the method for realizing a service-based Mobile Originated Short Message Service provided in the above-described embodiments of the present disclosure, the SMSF entity queries the SMS-IWMSC capable of providing the MO SMS forwarding service through the NRF entity, and further use the corresponding SMS-IWMSC to send the short message to the SC, thereby effectively realizing a fully service-based MO SMS within the range of 5GS.

Figure 2:
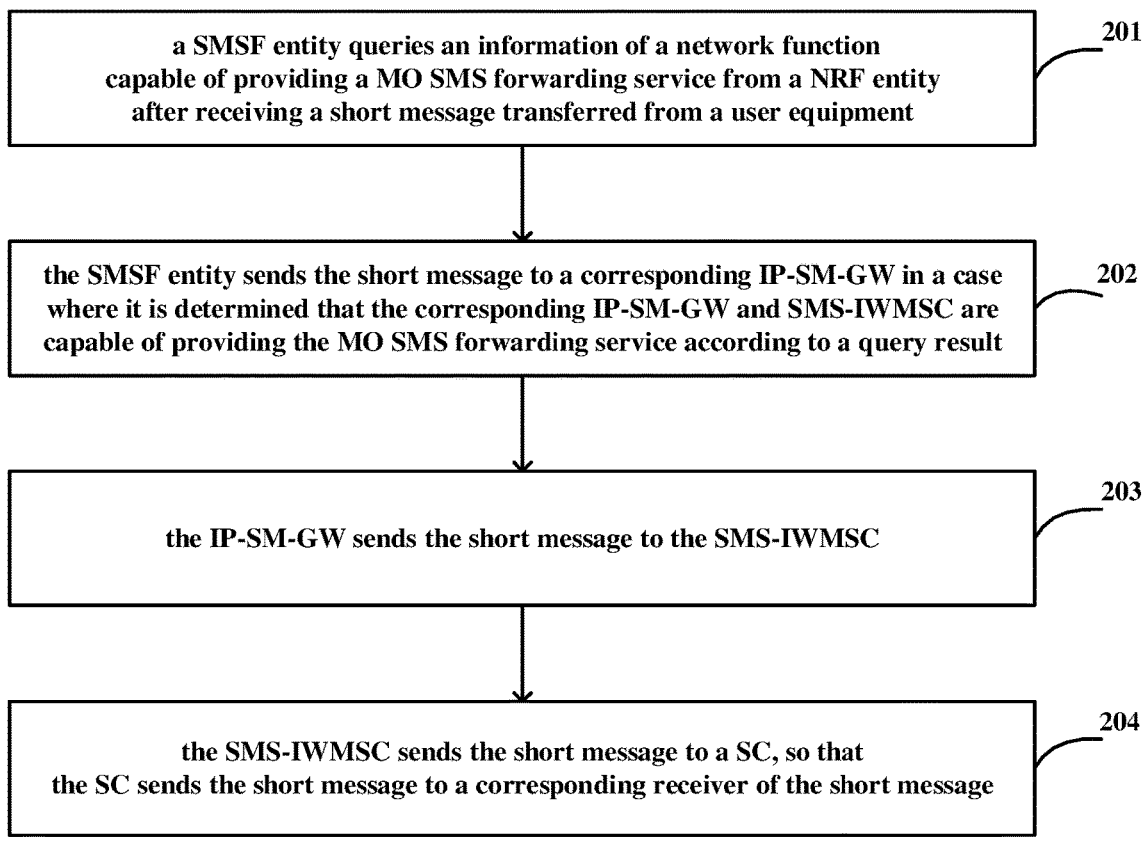
FIG. 2 is a schematic flowchart of a method for realizing a service-based Mobile Originated Short Message Service according to another embodiment of the present disclosure.

FIG. 2 is a schematic flowchart of a method for realizing a service-based Mobile Originated Short Message Service according to another embodiment of the present disclosure.

In Step 201, a SMSF entity queries an information of a network function capable of providing a MO SMS forwarding service from a NRF entity after receiving a short message transferred from a user equipment.

In Step 202, the SMSF entity sends the short message to a corresponding IP-SM-GW in a case where it is determined that the corresponding IP-SM-GW and SMS-IWMSC are capable of providing the MO SMS forwarding service according to a query result.

In some embodiments, the IP-SM-GW and the SMS-IWMSC register a capability of providing the MO SMS forwarding service in the NRF entity during a network function registration procedure.

In Step 203, the IP-SM-GW sends the short message to the SMS-IWMSC.

In some embodiments, the SMSF entity and the IP-SM-GW interact through a service-based interface, and the IP-SM-GW and the SMS-IWMSC interact through a service-based interface.

In Step 204, the SMS-IWMSC sends the short message to a SC, so that the SC sends the short message to a corresponding receiver of the short message.

In some embodiments, the SMS-IWMSC sends a delivery report which is sent by the SC, to the IP-SM-GW. The IP-SM-GW sends the delivery report to the SMSF entity. The SMSF entity sends the delivery report to the user equipment, thereby effectively realizing a fully service-based MO SMS within the range of 5GS.

Figure 3:
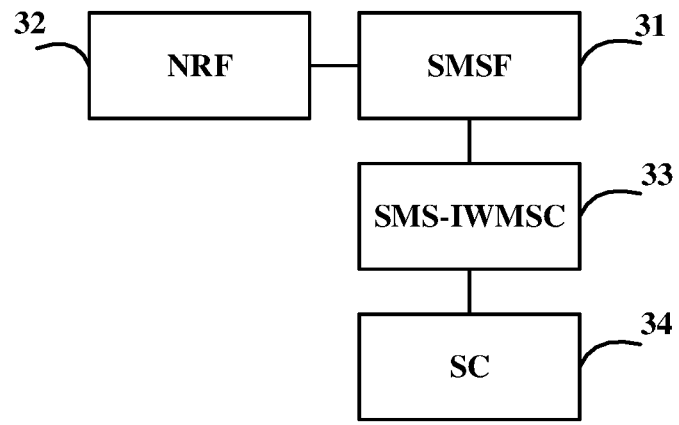
FIG. 3 is a schematic structural diagram of a system for realizing a service-based Mobile Originated Short Message Service according to one embodiment of the present disclosure.

FIG. 3 is a schematic structural diagram of a system for realizing a service-based Mobile Originated Short Message Service according to one embodiment of the present disclosure. As shown in FIG. 3, the system for realizing a service-based Mobile Originated Short Message Service comprises a SMSF entity 31, a NRF entity 32, a SMS-IWMSC 33 and a SC 34.

The SMSF entity 31 queries an information of a network function capable of providing a MO SMS forwarding service from the NRF entity 32 after receiving a short message transferred from a user equipment. The NRF entity 32 provides an information of a network function with a capability of the MO SMS forwarding service.

In some embodiments, the SMSF entity 31 queries the information of the network function capable of providing the MO SMS forwarding service from the NRF entity according to at least one of a SUPI, a GPSI, or an address of a SC, wherein the information of the network function capable of providing the MO SMS forwarding service comprises an IP address or a FQDN address of the corresponding SMS-IWMSC.

In some embodiments, the SMS-IWMSC 33 registers a capability of providing the MO SMS forwarding service in the NRF entity 32 during a network function registration procedure.

The SMSF entity 31 sends the short message to the SMS-IWMSC 33 in a case where it is determined that the corresponding SMS-IWMSC 33 is capable of providing the MO SMS forwarding service according to a query result.

In some embodiments, the SMSF entity 31 sends a callback IP address and an information of a timer for waiting to the SMS-IWMSC during a process of sending the short message to the SMS-IWMSC.

In some embodiments, the SMSF entity 31 and the SMS-IWMSC 33 interact through a service-based interface.

The SMS-IWMSC 33 sends the short message received to the SC 34, so that the SC 34 sends the short message to a corresponding receiver of the short message.

In some embodiments, the SMS-IWMSC 33 sends a delivery report, which is sent by the SC 34, to the SMSF entity 31 according to the callback IP address or a FQDN address of the SMSF entity. The SMSF entity 31 sends the delivery report to the user equipment.

In the system for realizing a service-based Mobile Originated Short Message Service provided in the above-described embodiments of the present disclosure, the SMSF entity queries the SMS-IWMSC capable of providing the MO SMS forwarding service through the NRF entity, and further use the corresponding SMS-IWMSC to send the short message to the SC, thereby effectively realizing a fully service-based MO SMS within the range of 5GS.

Figure 4:
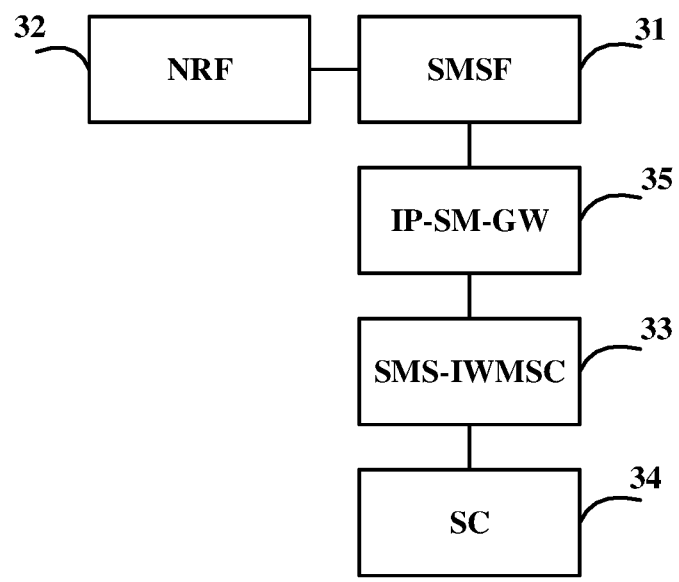
FIG. 4 is a schematic structural diagram of a system for realizing a service-based Mobile Originated Short Message Service according to another embodiment of the present disclosure.

FIG. 4 is a schematic structural diagram of a system for realizing a service-based Mobile Originated Short Message Service according to another embodiment of the present disclosure. The difference between FIG. 4 and FIG. 3 lies in that in the embodiment shown in FIG. 4, the system for realizing a service-based Mobile Originated Short Message Service further comprises an IP-SM-GW 35.

The SMSF entity 31 sends the short message to the corresponding IP-SM-GW 35 in a case where it is determined that the IP-SM-GW 35 and the SMS-IWMSC 33 are capable of providing the MO SMS forwarding service according to the query result. The IP-SM-GW 35 sends the short message to the SMS-IWMSC 33.

In some embodiments, the SMS-IWMSC 33 and the IP-SM-GW 35 register a capability of providing the MO SMS forwarding service in the NRF entity 32 during a network function registration procedure.

In some embodiments, the SMSF entity 31 and the IP-SM-GW 35 interact through a service-based interface, and the SMS-IWMSC 33 and the IP-SM-GW 35 interact through a service-based interface.

The SMS-IWMSC 33 sends the short message received to the SC 34, so that the SC 34 sends the short message to a corresponding receiver of the short message.

In some embodiments, the SMS-IWMSC 33 sends a delivery report, which is sent by the SC 34, to the IP-SM-GW 35. The IP-SM-GW 35 sends the delivery report to the SMSF entity 31. The SMSF entity 31 sends the delivery report to the user equipment.

Figure 5:
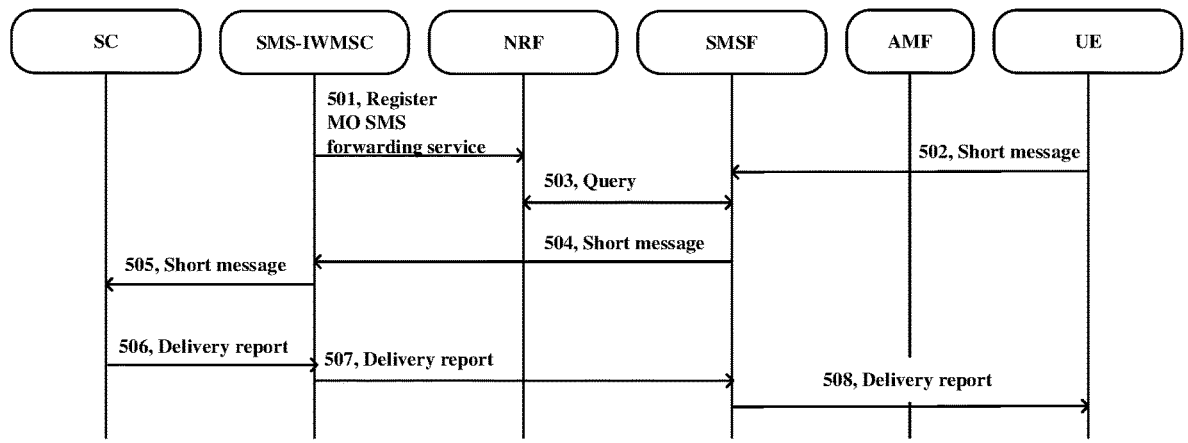
FIG. 5 is a schematic flowchart of a method for realizing a service-based Mobile Originated Short Message Service according to a further embodiment of the present disclosure.

FIG. 5 is a schematic flowchart of a method for realizing a service-based Mobile Originated Short Message Service according to a further embodiment of the present disclosure.

In Step 501, a SMS-IWMSC registers a capability of providing a MO SMS forwarding service in a NRF entity during a network function registration procedure.

In Step 502, a UE sends a short message to a SMSF entity through an Access and Mobility Management Function (AMF) entity.

In Step 503, the SMSF entity queries an information of a network function capable of providing the MO SMS forwarding service from the NRF entity according to at least one of a SUPI, a GPSI, or an address of a SC, wherein the information of the network function comprises an IP address or a FQDN address of the SMS-IWMSC.

In Step 504, the SMSF entity sends the short message, a callback IP address and an information of a timer for waiting to the corresponding SMS-IWMSC through a service-based interface, in a case where it is determined that the corresponding SMS-IWMSC is capable of providing the MO SMS forwarding service according to a query result.

In Step 505, the SMS-IWMSC sends the short message to the SC, so that the SC sends the short message to a corresponding receiver of the short message.

In Step 506, the SC sends a delivery report to the SMS-IWMSC.

In Step 507, the SMS-IWMSC sends the delivery report to the SMSF entity through a service-based interface according to the callback IP address or a FQDN address of the SMSF entity.

In Step 508, the SMSF entity sends the delivery report to the user equipment through the AMF entity.

Figure 6:
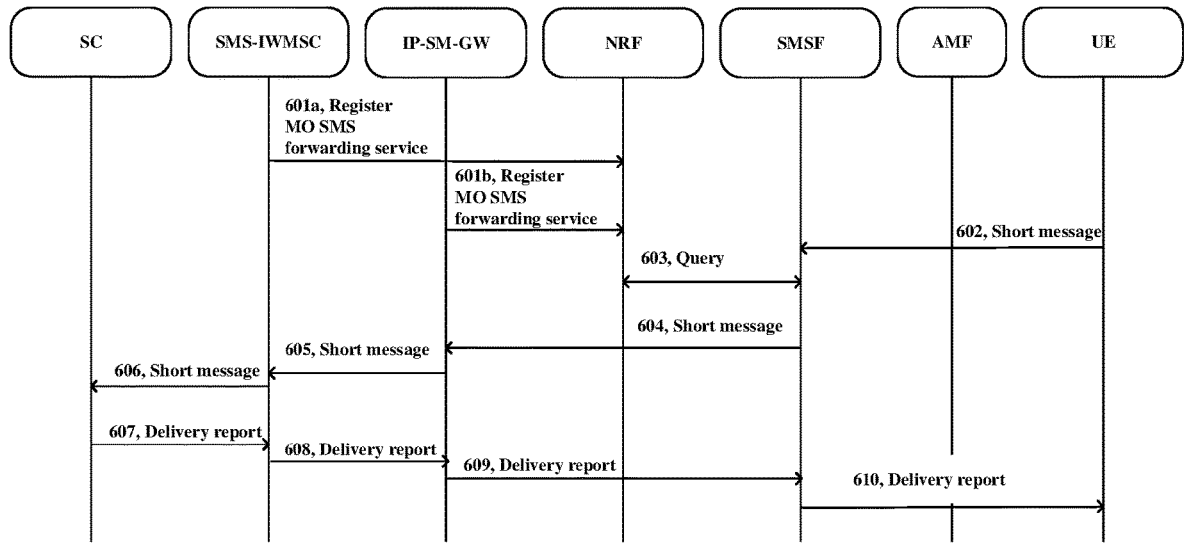
FIG. 6 is a schematic flowchart of a method for realizing a service-based Mobile Originated Short Message Service according to a further embodiment of the present disclosure.

FIG. 6 is a schematic flowchart of a method for realizing a service-based Mobile Originated Short Message Service according to a further embodiment of the present disclosure.

In Step 601a, a SMS-IWMSC registers a capability of providing a MO SMS forwarding service in a NRF entity during a network function registration procedure.

In Step 601b, an IP-SM-GW registers a capability of providing the MO SMS forwarding service in the NRF entity during a network function registration procedure.

In Step 602, a UE transfers a short message to a SMSF entity through an AMF entity.

In Step 603, the SMSF entity queries an information of a network function capable of providing the MO SMS forwarding service from the NRF entity according to at least one of a SUPI, a GPSI, or an address of a SC, and the information of the network function comprises an IP address or a FQDN address of the SMS-IWMSC.

In Step 604, the SMSF entity sends the short message, a callback IP address and an information of a timer for waiting to the corresponding IP-SM-GW through a service-based interface in a case where it is determined that the corresponding IP-SM-GW and SMS-IWMSC are capable of providing the MO SMS forwarding service according to a query result.

In Step 605, the IP-SM-GW sends the short message to the SMS-IWMSC through a service-based interface.

In Step 606, the SMS-IWMSC sends the short message to the SC, so that the SC sends the short message to a corresponding receiver of the short message.

In Step 607, the SC sends a delivery report to the SMS-IWMSC.

In Step 608, the SMS-IWMSC sends the delivery report to the IP-SM-GW through a service-based interface according to the callback IP address or a FQDN address of the SMSF entity.

In Step 609, the IP-SM-GW sends the delivery report to the SMSF entity through a service-based interface according to the callback IP address or a FQDN address of the SMSF entity.

In Step 610, the SMSF entity sends the delivery report to the user equipment.

By implementing the above-described embodiments of the present disclosure, a fully service-based MO SMS can be effectively realized within the range of 5GS. In addition, since the SMSF entity and the SMS-IWMSC interact through a service-based interface, and the IP-SM-GW interacts with the SMSF entity and SMS-IWMSC through a service-based interface respectively, the security issue caused by using MAP protocol or Diameter protocol when roaming across PLMN is effectively avoided.

In some embodiments, a functional unit described above may be implemented as a general-purpose processor, a Programmable Logic Controller (abbreviated as PLC), a Digital Signal Processor (abbreviated as DSP), an Application Specific Integrated Circuit (abbreviated as ASIC), a Field-Programmable Gate Array (abbreviated as FPGA) or other programmable logic devices, discrete gates or transistor logic devices, discrete hardware assemblies or any proper combination thereof used to execute a function described in the present disclosure.

Those of ordinary skill in the art may understand that all or part of the steps in the above-described embodiments may be accomplished by a hardware or may also be accomplished by a program to instruct relevant hardware. The program may be stored in a computer-readable storage medium. The storage medium mentioned above may be a read-only memory, a magnetic disk, an optical disk, or the like.

Descriptions of the present disclosure are made for purpose of exemplification and description instead of being exhaustive or limiting the present disclosure to the form as disclosed. Many modifications and variations are apparent for those skilled in the art. The embodiments are selected and described in order to better explain the principle and actual application of the present disclosure, and to enable those skilled in the art to understand the present disclosure so as to design various embodiments with various modifications adapted to a particular purpose.

What is claimed is:

1. A method for realizing a service-based Mobile Originated Short Message Service, comprising:
    querying, by a Short Message Service Function (SMSF) entity, an information of a network function capable of providing a Mobile Originated Short Message Service (MO SMS) forwarding service from a Network Repository Function (NRF) entity, after receiving a short message transferred from a user equipment;
    sending, by the SMSF entity, the short message to an Interworking Mobile Switching Center for Short Message Service (SMS-IWMSC), in a case where it is determined that the SMS-IWMSC is capable of providing the MO SMS forwarding service according to a query result; and
    sending, by the SMS-IWMSC, the short message to a Service Center (SC) of the short message, so that the SC sends the short message to a corresponding receiver of the short message.

2. The method according to claim 1, wherein the querying, by a SMSF entity, an information of a network function capable of providing a MO SMS forwarding service from a NRF entity comprises:
    querying, by the SMSF entity, the information of the network function capable of providing the MO SMS forwarding service from the NRF entity according to at least one of a Subscription Permanent Identifier (SUPI), a Generic Public Subscription Identifier (GPSI), or an address of the SC, wherein the information of the network function capable of providing the MO SMS forwarding service comprises an IP address or a Fully Qualified Domain Name (FQDN) address of the SMS-IWMSC.

3. The method according to claim 2, further comprising:
    sending, by the SMSF entity, a callback IP address and an information of a timer for waiting to the SMS-IWMSC during a process of sending the short message to the SMS-IWMSC.

4. The method according to claim 3, further comprising:
    sending, by the SMS-IWMSC, a delivery report, which is sent by the SC, to the SMSF entity according to the callback IP address or a FQDN address of the SMSF entity; and
    sending, by the SMSF entity, the delivery report to the user equipment.

5. The method according to claim 4, wherein:
    the SMSF entity and the SMS-IWMSC interact through a service-based interface.

6. The method according to claim 1, further comprising:
    registering, by the SMS-IWMSC, a capability of providing the MO SMS forwarding service in the NRF entity during a network function registration procedure.

7. The method according to claim 1, further comprising:
    sending, by the SMSF entity, the short message to an IP-Short Message-Gateway (IP-SM-GW), in a case where it is determined that the IP-SM-GW and the SMS-IWMSC are capable of providing the MO SMS forwarding service according to the query result; and
    sending, by the IP-SM-GW, the short message to the SMS-IWMSC.

8. The method according to claim 7, further comprising:
    sending, by the SMS-IWMSC, a delivery report, which is sent by the SC, to the IP-SM-GW;
    sending, by the IP-SM-GW, the delivery report to the SMSF entity; and
    sending, by the SMSF entity, the delivery report to the user equipment.

9. The method according to claim 8, wherein:
    the SMSF entity and the IP-SM-GW interact through a service-based interface; and
    the SMS-IWMSC and the IP-SM-GW interact through a service-based interface.

10. The method according to claim 7, further comprising:
    registering, by the SMS-IWMSC, a capability of providing the MO SMS forwarding service in the NRF entity during a network function registration procedure; and
    registering, by the IP-SM-GW, a capability of providing the MO SMS forwarding service in the NRF entity during a network function registration procedure.

11. A system for realizing a service-based Mobile Originated Short Message Service, comprising:
    a Short Message Service Function (SMSF) entity configured to query an information of a network function capable of providing a Mobile Originated Short Message Service (MO SMS) forwarding service from a Network Repository Function (NRF) entity after receiving a short message transferred from a user equipment, and send the short message to an Interworking Mobile Switching Center for Short Message Service (SMS-IWMSC) in a case where it is determined that the SMS IWMSC is capable of providing the MO SMS forwarding service according to a query result;
    the NRF entity configured to provide an information of a network function with a capability of the MO SMS forwarding service;
    the SMS-IWMSC configured to send the short message to a Service Center (SC) of the short message; and
    the SC configured to send the short message to a corresponding receiver of the short message.

12. The system according to claim 11, wherein:
    the SMSF entity is configured to query the information of the network function capable of providing the MO SMS forwarding service from the NRF entity according to at least one of a Subscription Permanent Identifier (SUPI), a Generic Public Subscription Identifier (GPSI), or an address of the SC, wherein the information of the network function capable of providing the MO SMS forwarding service comprises an IP address or a Fully Qualified Domain Name (FQDN) address of the SMS-IWMSC.

13. The system according to claim 12, wherein:
    the SMSF entity is further configured to send a callback IP address and an information of a timer for waiting to the SMS-IWMSC during a process of sending the short message to the SMS-IWMSC.

14. The system according to claim 13, wherein:
    the SMS-IWMSC is further configured to send a delivery report, which is sent by the SC, to the SMSF entity according to the callback IP address or a FQDN address of the SMSF entity; and
    the SMSF entity is further configured to send the delivery report to the user equipment.

15. The system according to claim 14, wherein:
    the SMSF entity and the SMS-IWMSC interact through a service-based interface.

16. The system according to claim 11, wherein:
the SMS-IWMSC is configured to register a capability of providing the MO SMS forwarding service in the NRF entity during a network function registration procedure.

17. The system according to claim 11, further comprising an IP-Short Message-Gateway (IP-SM-GW), wherein:
the SMSF entity is further configured to send the short message to the IP-SM-GW in a case where it is determined that the IP-SM-GW and the SMS-IWMSC are capable of providing the MO SMS forwarding service according to the query result; and
the IP-SM-GW is configured to send the short message to the SMS-IWMSC.

18. The system according to claim 17, wherein:
the SMS-IWMSC is further configured to send a delivery report, which is sent by the SC, to the IP-SM-GW;
the IP-SM-GW is further configured to send the delivery report to the SMSF entity; and
the SMSF entity is further configured to send the delivery report to the user equipment.

19. The system according to claim 18, wherein:
the SMSF entity and the IP-SM-GW interact through a service-based interface; and
the SMS-IWMSC and the IP-SM-GW interact through a service-based interface.

20. The system according to claim 17, wherein:
The SMS-IWMSC is configured to register a capability of providing the MO SMS forwarding service in the NRF entity during a network function registration procedure; and
the IP-SM-GW is configured to register a capability of providing the MO SMS forwarding service in the NRF entity during a network function registration procedure.

* * * * *